(12) United States Patent
Yamamoto (10) Patent No.: US 7,183,762 B2
(45) Date of Patent: Feb. 27, 2007

(54) APPARATUS AND METHOD FOR EVALUATING MAGNETIC HEADS, AND DISK FOR USE IN EVALUATING MAGNETIC HEADS

(75) Inventor: Kenrou Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 296 days.

(21) Appl. No.: 10/711,782

(22) Filed: Oct. 5, 2004

(65) Prior Publication Data
US 2006/0022668 A1 Feb. 2, 2006

(30) Foreign Application Priority Data
Jul. 30, 2004 (JP) .............................. 2004-223357

(51) Int. Cl.
*G01R 33/12* (2006.01)
(52) U.S. Cl. .................................................... 324/210
(58) Field of Classification Search ................ 324/210, 324/211, 212, 260, 261, 262; 360/25, 31, 360/75, 324.11
See application file for complete search history.

(56) References Cited

U.S. PATENT DOCUMENTS

| 5,952,563 A | * | 9/1999 | Shiraki | 73/105 |
| 5,998,993 A | * | 12/1999 | Inage et al. | 324/210 |
| 6,140,814 A | * | 10/2000 | Sundaram | 324/212 |
| 6,275,028 B1 | | 8/2001 | Matsui et al. | 324/210 |
| 6,373,647 B1 | * | 4/2002 | Baker | 360/25 |
| 6,400,519 B2 | * | 6/2002 | Mukoyama | 360/31 |
| 6,797,130 B2 | * | 9/2004 | Kavosh et al. | 428/835.1 |
| 6,965,229 B2 | * | 11/2005 | Duan et al. | 324/210 |
| 2002/0063984 A1 | * | 5/2002 | McClellan et al. | 360/46 |

FOREIGN PATENT DOCUMENTS

JP 2001-006133 1/2001

* cited by examiner

*Primary Examiner*—Edward Lefkowitz
*Assistant Examiner*—Kenneth J. Whittington
(74) *Attorney, Agent, or Firm*—Armstrong, Kratz, Quintos, Hanson & Brooks, LLP (57) ABSTRACT

A DC current is supplied to the write coil of a GMR head 1 equipped with a completed HGA (Head Gimbal Assembly). The element part of the GMR head 1 is thereby thermally deformed. Thus deformed, the element part protrudes, abutting on a rotating laser-bump disk 2, above which the HGA is floating. When the element part abuts on the disk 2, a magnetic field (2470 gauss) that extends in a direction opposite to the magnetization direction of the fixed layer of the GMR head 1 is applied to the top of a core slider 5.

13 Claims, 7 Drawing Sheets

APPARATUS AND METHOD FOR EVALUATING MAGNETIC HEADS, AND DISK FOR USE IN EVALUATING MAGNETIC HEADS

BACKGROUND OF THE INVENTION

1. Field of the Invention

The present invention relates to an apparatus and method for evaluating magnetic heads. More particularly, the invention relates to a technique of evaluating GMR heads before they are incorporated into magnetic disk drives. The invention relates to an apparatus, a method and a disk that can evaluate GMR heads that cause no magnetic inversion at the GMG-head supporting layer of a magnetic disk drive after a GMR head is incorporated into the magnetic disk drive.

2. Description of the Related Art

In recent years, magnetic disk drives have become smaller and have acquired a larger storage capacity. It is therefore increasingly demanded that magnetic disk drives should magnetically reproduce data from disks at higher sensitivity. Developed recently as a magnetic head with use of a magnetoresistive effect is the GMR head (also known as spin-valve head).

The head element of the GMR head has a spin-valve film that is only 20 nm thick. The head element is inevitably very weak to ESD as a result of static electricity. Consequently, the GMR head has a withstand voltage of only about 5 V, which is far smaller than that (about 100 V) of the inductive thin-film heads that were widely used before the GMR came into general use.

The GMR head has a breakdown mode, as the studies made hitherto reveal. The breakdown is a magnetic breakdown that results from the large-current magnetic field caused by the above-mentioned ESD. The magnetic breakdown is a phenomenon in which the magnetic field generated from a large current impairs the magnetic stability in the spin-valve film, inevitably forming a magnetic domain, although the spin-valve film is not physically broken.

More specifically, the GMR element has a fixed layer (PIN layer), a free layer, and an anti-ferromagnetic layer. The GMR element generates a positive output when its resistance increases as the fixed layer and the free layer are magnetized in opposite directions. It generates a negative output when its resistance decreases as the fixed layer and the free layer are magnetized in the same direction. The fixed layer is oriented, opposing the signal magnetic flux emanating from a recording medium that lies at right angles to the track-width direction, because the anti-ferromagnetic layer achieves exchange coupling. By contrast, the free layer is oriented parallel to the signal magnetic flux emanating from a recording medium or parallel to the track-width direction, because permanent magnets are provided at the ends of the free layer to control the magnetic domain. Hence, the magnetization direction of the fixed layer is important, determining the polarity (positive or negative) of the output waveform.

When an ESD flows in the fixed layer, a magnetic field of the opposite direction is generated, inverting the magnetization direction (PIN direction) of the fixed layer. Namely, magnetic breakdown (PIN inversion) takes place. The magnetic breakdown results in neither resistance change nor shape change, but causes an abnormal waveform in the output of the GMR element. For example, the magnetic breakdown makes the reproduced waveform unstable or changes the amplitudes of the positive and negative halves of the reproduced waveform If this magnetic breakdown occurs, the magnetic head cannot correctly detect the data. This causes errors in the data or makes it impossible to reproduce the servo signals. Then, the magnetic head can no longer be accurately positioned. Hitherto, any head that is found in the head test (HT) to cause such magnetic breakdown is discarded and not used in magnetic disk drives.

Further, a method of evaluating magnetic heads is known (see, for example, Jpn. Pat. Appln. Laid-Open Publication No. 2001-6133). In the method, a magnetic head records data patterns on a recording medium, one pattern for time T1 between a positive pulse and a negative pulse, and another pattern for time T2, between a negative pulse and a positive pulse, shorter than time T1. Then, the data patterns are reproduced from the recording medium. Time T2 measured of a data waveform reproduced is subtracted from time 1 measured of the data waveform. If the difference, (T1−T2), has a negative value, the direction of magnetization of the fixed layer of the GMR element is considered to have inverted.

However, a magnetic head that is found to be a good one in the test may reproduce a data waveform inverted in polarity with respect to a normal data waveform in the final test carried out after the magnetic head has been incorporated into a magnetic disk drive. Consequently, the data signals or the servo signals that the head has reproduced are erroneous. This is probably because the magnetic head has ESD not so prominent as to cause waveform inversion and therefore passes the first test, and is incorporated into a magnetic disk drive, but receives a small impact as a result of, for example, contamination, inevitably generating a inverse magnetic field and hence inverting the direction of magnetization of the GMR element. (The small impact is perhaps micro-ESD, which does not usually result in polarity inversion in the fixed layer of the GMR element.)

SUMMARY OF THE INVENTION

An object of the present invention is to provide an apparatus and method for evaluating magnetic heads, which can reliably detect any magnetic head whose magnetic element undergoes the inversion of magnetization even after the head is incorporated into a magnetic disk drive. The apparatus and the method can therefore help to provide reliable magnetic heads that are proved not to undergo inversion in the direction of magnetization (i.e., PIN inversion) after they are incorporated into magnetic disk drives.

To achieve the above-mentioned object, an apparatus for evaluating a magnetic head, according to the present invention, is designed to determine as to whether the fixed layer of the magnetic head has undergone inversion of a magnetization direction. The apparatus includes: a support unit that supports the magnetic head above a disk that is rotating and has bumps; a DC-current supplying unit that supplies a DC current to a write coil of the magnetic head, thereby thermally deforming an element part of the magnetic head and making the element part to protrude and abut on the bumps, thus applying an impact to the disk; and a magnetism-applying unit that applies a magnetic field to the top of a core slider of the magnetic head when the element part abuts on the bumps, said magnetic field extending in a direction opposite to the magnetization direction of the fixed layer.

In the apparatus for evaluating a magnetic head, according to the present invention, the disk may be a laser-bump disk that has bumps formed on a surface by applying a laser beam to the surface. The apparatus may further have a sense-current supplying unit that supplies a sense current to the magnetic head when the element part abuts on the bumps.

The apparatus may further comprise a voltage-monitoring unit that monitors a voltage at which a sense current is supplied. The apparatus may further include a mechanism that moves the magnetic head in the disk having bumps formed in a region extending in a radial direction and arranged at predetermined intervals in a circumferential direction, between a region of the disk, where the bumps are formed, and a region of the disk, where no bumps are formed.

A method of evaluating a magnetic head, according to the present invention, is designed to determine as to whether the fixed layer of the magnetic head has undergone inversion of a magnetization direction. In the method, the magnetic head is supported above a disk that is rotating and has bumps. A DC current is supplied to a write coil of the magnetic head, thereby thermally deforming an element part of the magnetic head and making the element part protrude and abut on the bumps, thus applying an impact to the disk. A magnetic field is applied to the top of a core slider of the magnetic head when the element part abuts on the bumps, thereby to determine as to whether the fixed layer of the magnetic head has undergone inversion of magnetization direction. The magnetic field extends in a direction opposite the magnetization direction of the fixed layer.

Another method of evaluating a magnetic head, according to the present invention, is designed to determine as to whether the fixed layer of the magnetic head has undergone inversion of magnetization direction. This method comprises: a first Dibit waveform-acquiring step of acquiring a first Dibit waveform by monitoring a voltage at which a sense current is supplied, over a disk that is rotating and has no bumps; an impact-applying step of applying an impact to the disk, first by supporting the magnetic head above a disk rotating and having bumps, and supplying a DC current to a write coil of the magnetic head, thereby thermally deforming an element part of the magnetic head and making the element part to protrude and abut on the bumps, then by applying a magnetic field to the top of a core slider of the magnetic head when the element part abuts on the bumps, said magnetic field extending in a direction opposite to the magnetization direction of the fixed layer; a second Dibit waveform-acquiring step of acquiring a second Dibit waveform by monitoring a voltage at which a sense current is supplied, over the disk that is rotating and has no bumps; and an inversion-detecting step of determining as to whether the fixed layer of the magnetic head has undergone inversion of magnetization direction, by comparing the first Dibit waveform with the second Dibit waveform.

In this method, the disk may have bumps formed in a region extending in a radial direction and arranged at predetermined intervals in a circumferential direction. In the first and second Dibit waveform-acquiring steps, the magnetic head may be supported above a region of the disk, where no bumps are formed. In the impact-applying step, the magnetic head may be supported above the region of the disk, where the bumps are formed.

Further, the magnetic head may be evaluated after the magnetic head has been equipped with a completed HGA (Head Gimbal Assembly).

A disk according to the present invention is designed for use in a method of evaluating a magnetic head by applying an impact to the magnetic head under specific condition and then determining as to whether the fixed layer of the magnetic head undergoes the inversion of magnetization direction. The disk has bumps that apply the impact to the magnetic head while being rotated.

The disk may have bumps that have been formed by applying a laser beam to a disk-shaped medium. The disk may have a bump region in which bumps are formed, and a non-bump region in which no bumps are formed.

As described above in detail, the present invention can provide a method of evaluating a magnetic head which minimally damages the element part of the magnetic head. Although the method is very simple, the method can prevent the fixed layer of the GMR element from undergoing inversion of magnetization direction after the magnetic head is incorporated into a magnetic disk drive. Thus, any magnetic disk drive that has a magnetic head evaluated by this method as a good one can be very reliable, scarcely causing damage in the field.

DETAILED DESCRIPTION OF THE PREFERRED EMBODIMENTS

Hereinafter, embodiments of the present invention will be described, with reference to the accompanying drawings.

Figure 1:
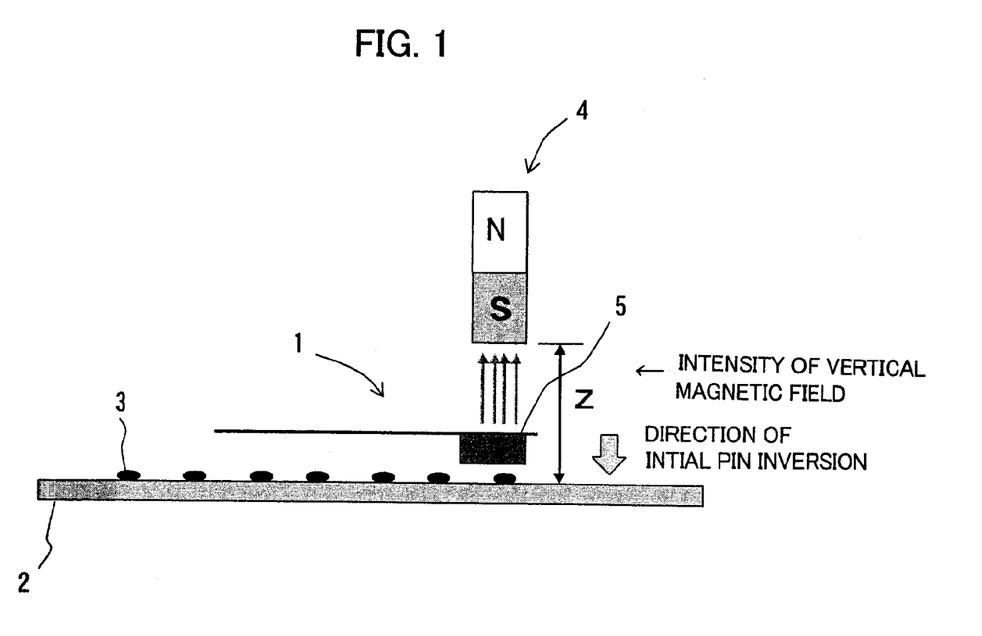
FIG. 1 is a diagram illustrating the concept of a method of evaluating magnetic heads, according to an embodiment of the present invention.
Figure 2:
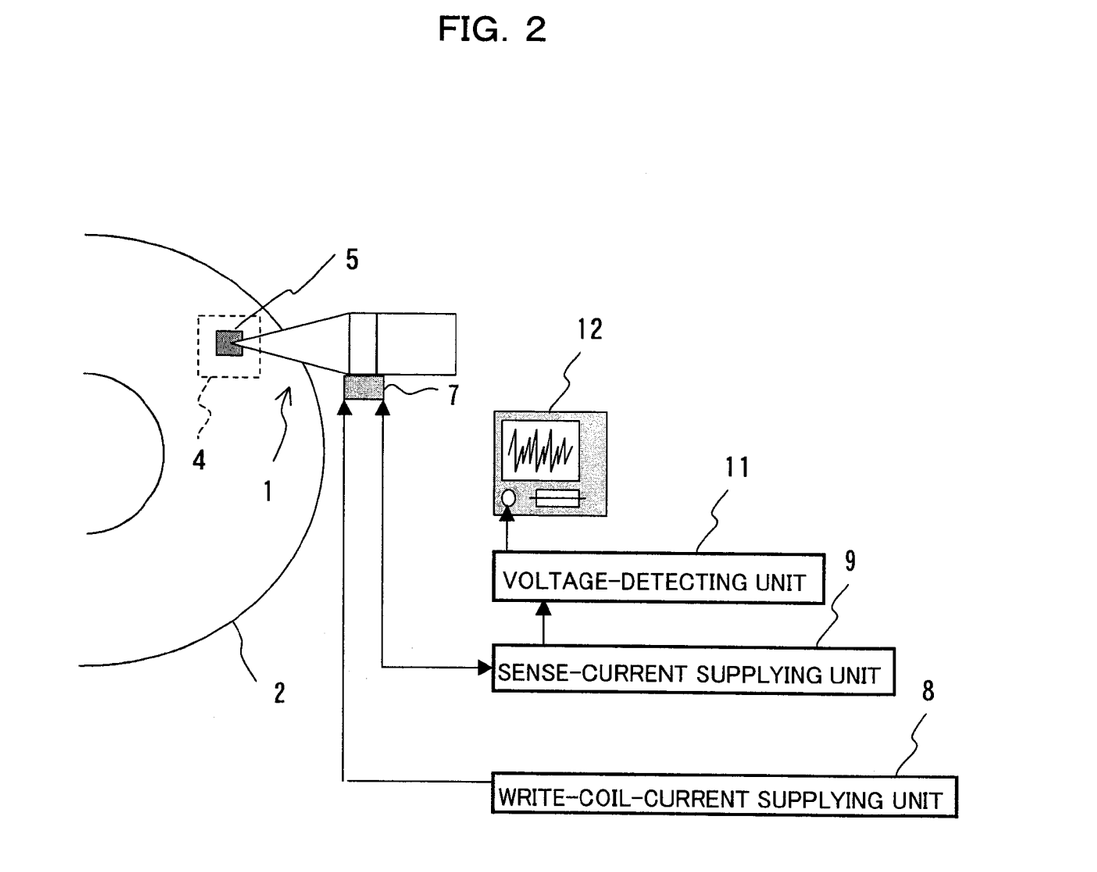
FIG. 2 is a diagram showing an apparatus for evaluating magnetic heads, according to the embodiment of the present invention.
Figure 3:
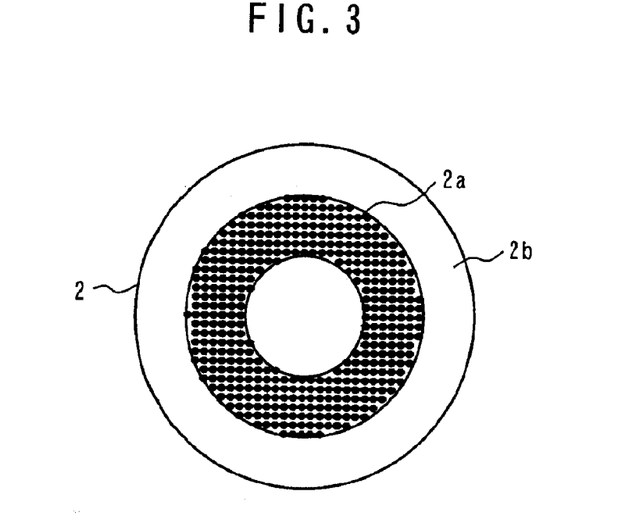
FIG. 3 is a plan view depicting a laser-bump disk.
Figure 4:
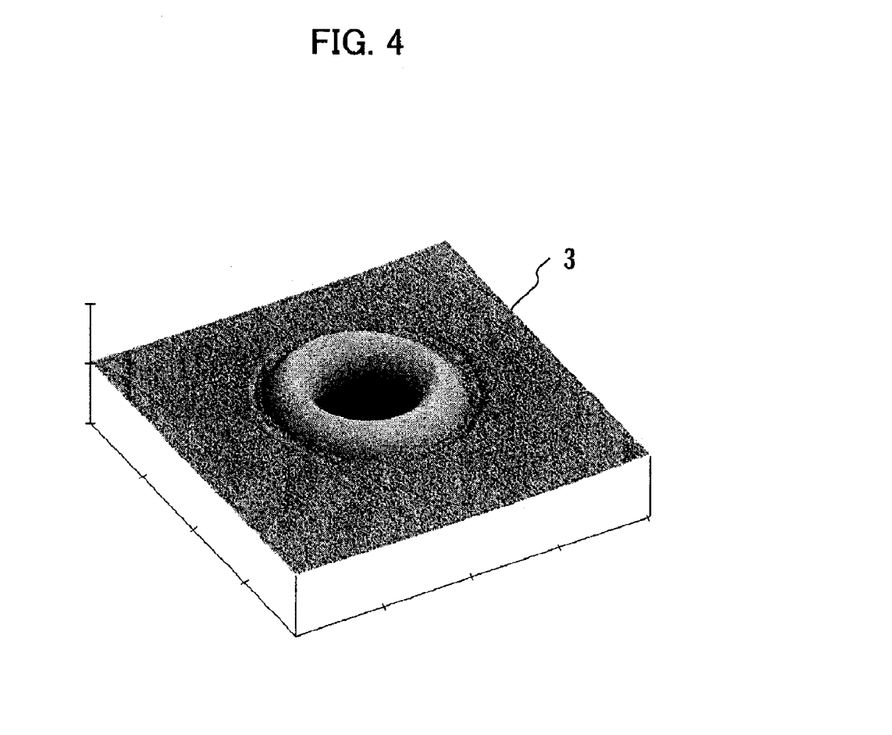
FIG. 4 is a perspective view of a laser bump.
Figure 5:
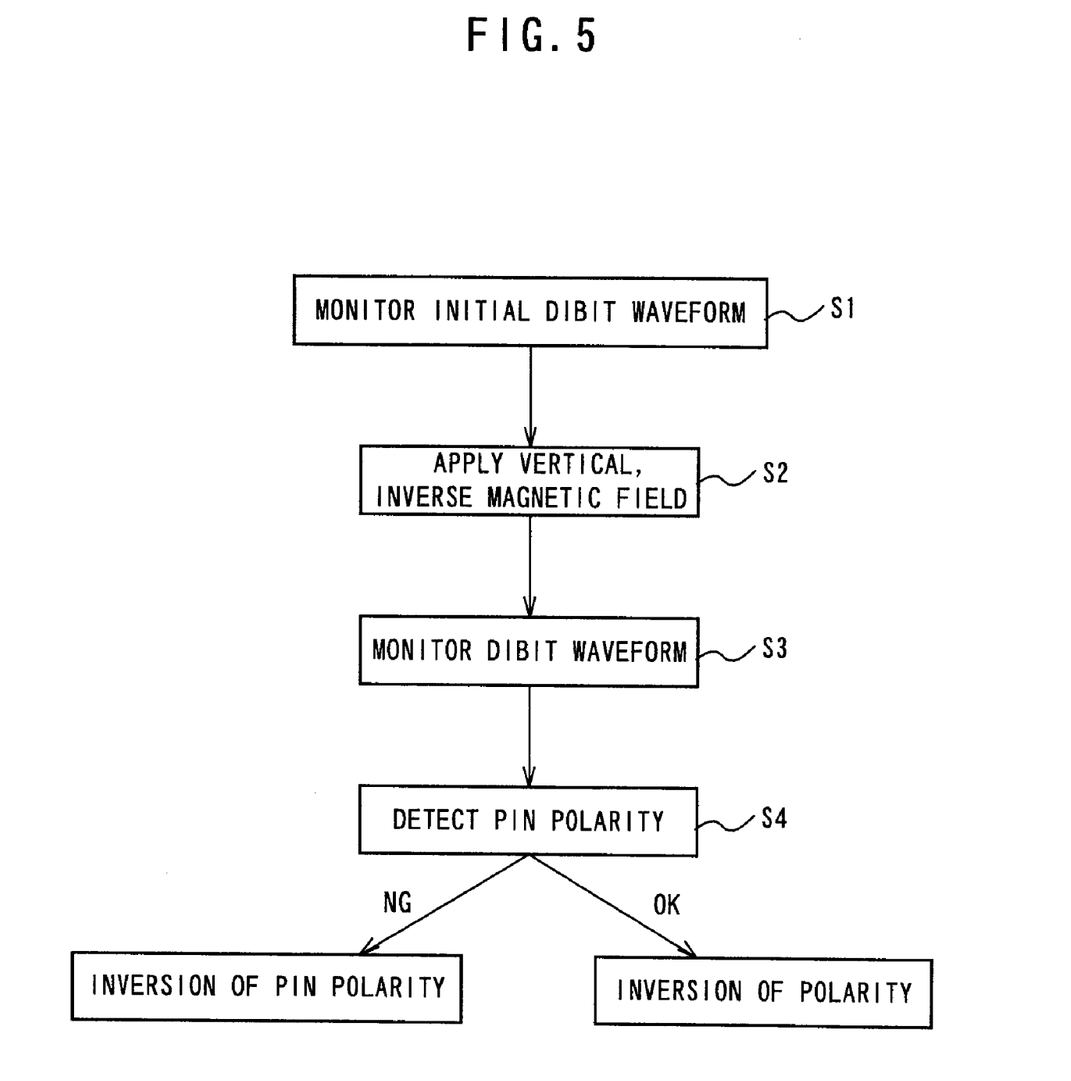
FIG. 5 is a diagram explaining an algorithm of the method of evaluating magnetic heads, according to an embodiment of this invention.
Figure 6A:
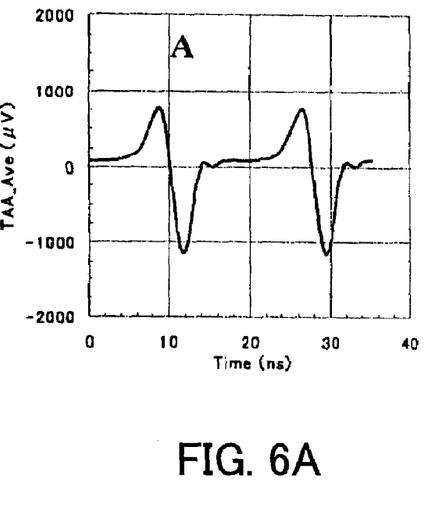
FIGS. 6A and 6B are diagrams representing PIN inversion.
Figure 6B:
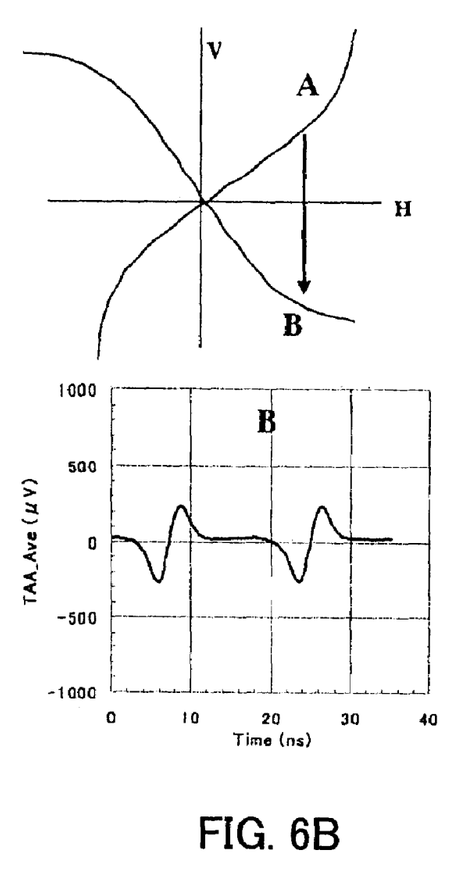

FIG. 1 is a diagram illustrating a method of evaluating magnetic heads, according to an embodiment of the invention. FIG. 2 is a block diagram of an apparatus for evaluating magnetic heads, according to another embodiment of this invention. FIG. 3 is a plan view depicting a disk that is used in the present embodiment. FIG. 4 is a perspective view of one of the laser bumps used in the present embodiment. FIG. 5 is a diagram explaining an algorithm of the method of evaluating magnetic heads according to this embodiment. FIGS. 6A and 6B are diagrams representing the PIN inversion observed at the laser bump shown in FIG. 4.

The method of evaluating magnetic heads, according to this embodiment, is designed to determine as to whether the fixed layer of a GMR head 1 undergoes the inversion of magnetization direction (i.e., PIN inversion). In the method, as shown in FIG. 1 the GMR head 1 having a completed HGA (Head Gimbal Assembly) is supported above a laser-bump disk 2 (i.e., disk having bumps 3 formed by applying a laser beam to the disk). The laser-bump disk 2 is rotated, forming a layer of air and making the GMR head 1 float above the disk 2. Then, a DC current is made to flow in the write coil of the GMR head 1, causing a head element to protrude by virtue of thermal deformation. The head element abuts on the laser-bump disk 2. At this time, a bar magnet 4 is held above the GMR head 1, applying a magnetic field (2,470 Gauss) to the top of the core slider 5. This magnetic field extends in the direction opposite to the magnetization direction of the fixed layer. In this embodiment, a sense current is supplied to the GMR head 1 in order to enhance the reliability of evaluation.

As shown in FIG. 2, the apparatus for evaluating magnetic heads according to another embodiment comprises a support unit 7, a write-coil-current supplying unit 8, a bar magnet 4, a sense-current supplying unit 9, a voltage-detecting unit 11, and an oscilloscope (voltage-monitoring unit) 12. The support unit 7 supports the GMR head 1 above the laser-bump disk 2 that is rotating. The write-coil current supplying unit 8 supplies a DC current to the write coil of the GRM head 1 through the support unit 7, thereby thermally deforming the head element and causing the same to protrude. The bar magnet 4 is held above the GMR head 1 and applies a magnetic field (2,470 Gauss) to the top of the core slider 5 when the head element abuts on the laser-bump disk 2. The magnetic field extends in the direction opposite the magnetization direction of the fixed layer. The sense-current supplying unit 9 supplies a sense current. The voltage-detecting unit 11 detects the voltage applied when the sense current is supplied. The oscilloscope 12 is connected to the voltage-detecting unit 11, to display the voltage detected by the unit 11, and observe a Dibit waveform.

The laser bumps 3 in this embodiment are formed on the laser-bump disk 2, which is a 3.5-inch AI disk (FIG. 3). They are arranged within a radius of 20 to 30 mm, at a pitch of 100 μm in the circumferential direction. As seen from FIG. 4, each laser bump 3 has a height of 7 nm and a diameter of 7 μm. Thus, as shown in FIG. 3, the laser-bump disk 2 has a region (laser-bump region 2a) having a diameter of 20 to 30 mm, in which the laser bumps 3 are formed, and a region (non-laser-bump region 2b) surrounding the laser-bump region 2a, in which no laser bumps 3 are formed. The laser-bump region 2a is used in the impact-applying step, which will be described later. The non-laser-bump region 2b is used in the Dibit-waveform-acquiring step, which will be described later.

The method of evaluating magnetic heads, according to this embodiment, will be described, with reference to FIG. 5.

(Acquisition of the First Dibit Waveform: Step S1)

First, the GMR head 1 was held above the non-laser-bump region 2b of the laser-bump disk 2, in order to acquire and monitor a first (initial) Dibit waveform. The sense-current supplying unit 9 supplied a sense current of, for example, 3 mA. The write-coil-current supplying unit 8 supplied a write-coil current, i.e., AC 40 mA (100 MHz). The disk 2 was rotated at a circumferential velocity of, for example, 41 m/s, at a Yaw angle of 15°. In this case, such a waveform as illustrated in FIG. 6A was acquired.

(Application of an Impact: Step S2)

Next, the GMR head 1 was moved to the laser-bump region 2a of the disk 2, in order to apply an impact to the laser-bum region 2a. In this impact-applying step, the head 1 applied impact to the laser-bump disk 2 for 10 minutes, while rotating the disk 2 at a circumferential velocity of, for example, 41 m/s, at a Yaw angle of 15°, and supplying a sense current Is of 2.9 mA and a write current Iw of about DC 100 mA. In this step, the distance between the bar magnet 4 and the core slider 5, measured in the vertical direction, was changed, thereby applying four vertical magnetic fields of 547 gauss, 1230 gauss, 1700 gauss and 2470 gauss. In addition, the sense current was supplied in some cases, and no sense current was supplied in other cases, in order to demonstrate the effect of the sense current.

(Observation of the Second Dibit Waveform: Step S3)

After the impact was applied to the laser-bump disk 2, the GMR head 1 was moved back to the non-laser-bump region 2b of the disk 2. Then, a second Dibit waveform shown in FIG. 6B was thereby acquired. The first Dibit waveform and the second Dibit waveform shown in FIGS. 6A and 6B were compared (Step S4), to determine as to whether the fixed layer has undergone the inversion of PIN polarity (PIN inversion). If PIN inversion is detected, the GMR head 1 is evaluated as a defective one. If no PIN inversion is detected, the GMR head 1 is evaluated as a good one. (In this case, the GMR head 1 would not undergo the inversion of magnetization direction even if incorporated into a magnetic disk drive.)

Figure 7:
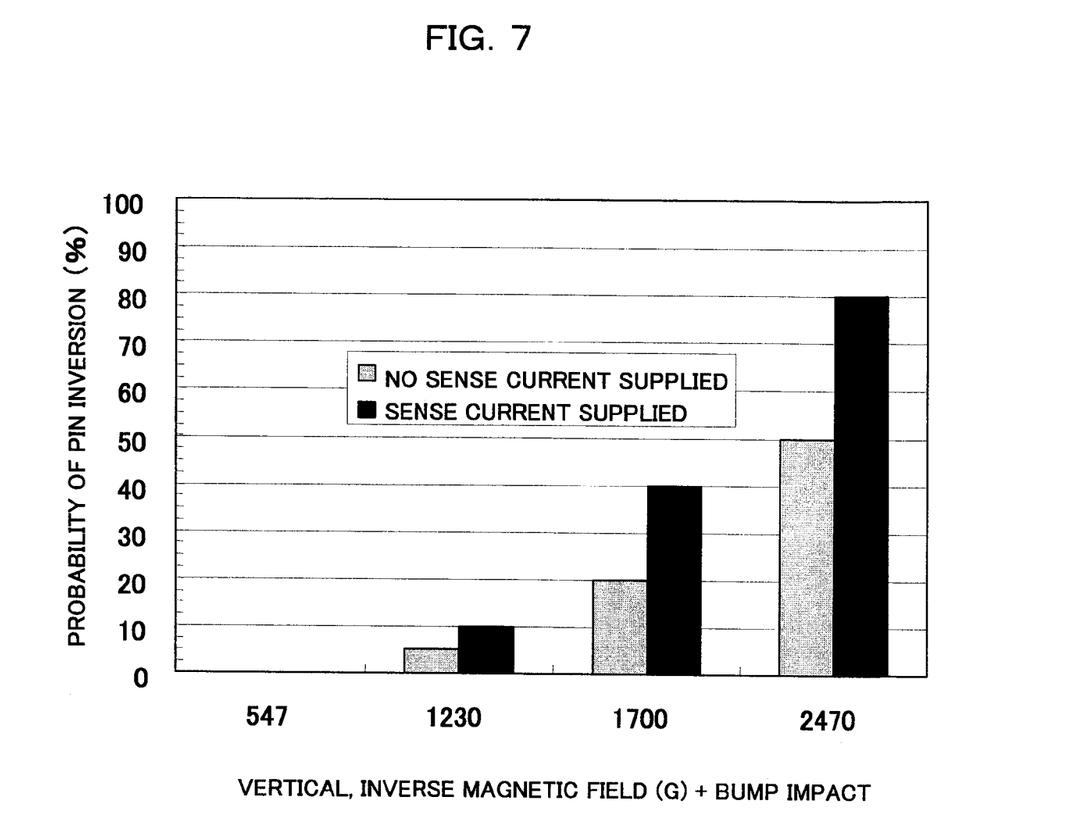
FIG. 7 is a graph representing the relation between the probability of PIN inversion rate and the vertical magnetic field, which was observed when a magnetic head was tested in the conditions according to this invention.

FIG. 7 shows the results of the evaluation described above. More precisely, FIG. 7 represents the results of evaluating the GMR head 1 by supplying or not applying a sense current to the four vertical magnetic fields of 547 gauss, 1230 gauss, 1700 gauss and 2470 gauss. As can be understood from FIG. 7, the more intense the vertical, inverse magnetic field, the higher the probability of PIN inversion in the fixed layer will be. FIG. 7 also reveals that the PIN inversion is more likely to occur when a sense current is supplied, than when no sense current is supplied. Obviously, the sense current plays an important role on the PIN inversion. The element part was examined after the GMR head 1 applied impact to the laser-bump disk 2. No scratches or damages were observed on the element part.

Figure 8:
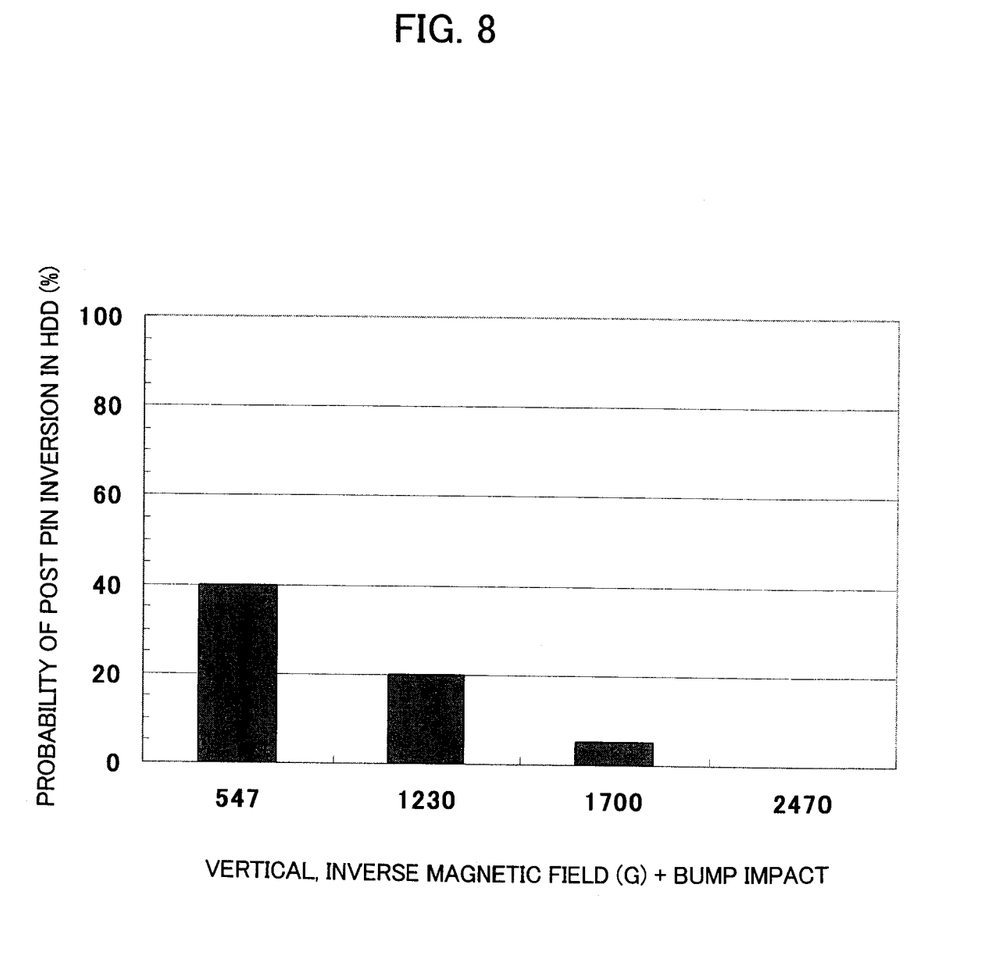
FIG. 8 is a graph representing the relation between the probability of post PIN inversion rate and the vertical magnetic field, which was observed when the magnetic head was tested after incorporated into a hard disk drive (HDD), in connection with FIG. 7.

Moreover, the GMR head 1 thus evaluated as shown in FIG. 7 was incorporated into a magnetic disk drive. The magnetic disk drive was tested to see if the fixed layer of the GMR head 1 undergoes PIN inversion (hereinafter called "post PIN inversion" because it occurs after the incorporation). FIG. 8 shows the results of this test. As is evident from FIG. 8, the less intense the vertical magnetic field applied, the higher the probability of post PIN inversion in the fixed layer will be.

What is claimed is:

1. An apparatus for evaluating a magnetic head, designed to determine as to whether the fixed layer of the magnetic head has undergone inversion of magnetization direction, said apparatus comprising:

a support unit that supports the magnetic head above a disk that is rotating and has bumps;

a DC-current supplying unit that supplies a DC current to a write coil of the magnetic head, thereby thermally deforming an element part of the magnetic head and making the element part to protrude and abut on the bumps, thus applying an impact to the disk; and a magnetism-applying unit that applies a magnetic field to the top of a core slider of the magnetic head when the element part abuts on the bumps, said magnetic field extending in a direction opposite the magnetization direction of the fixed layer.

2. The apparatus according to claim 1, wherein said disk is a laser-bump disk that has bumps formed on a surface by applying a laser beam to the surface.

3. The apparatus according to claim 1, further comprising a sense-current supplying unit that supplies a sense current to the magnetic head when the element part abuts on the bumps.

4. The apparatus according to claim 1, further comprising a voltage-monitoring unit that monitors a voltage at which a sense current is supplied.

5. The apparatus according to claim 1, further comprising a mechanism that moves the magnetic head in the disk having bumps formed in a region extending in a radial direction and arranged at predetermined intervals in a circumferential direction, between a region of the disk, where the bumps are formed, and a region of the disk, where no bumps are formed.

6. A method of evaluating a magnetic head, designed to determine as to whether the fixed layer of the magnetic head has undergone inversion of magnetization direction,
   wherein the magnetic head is supported above a disk that is rotating and has bumps;
   a DC current is supplied to a write coil of the magnetic head, thereby thermally deforming an element part of the magnetic head and making the element part to protrude and abut on the bumps, thus applying an impact to the disk; and
   a magnetic field is applied to the top of a core slider of the magnetic head when the element part abuts on the bumps, thereby to determine as to whether the fixed layer of the magnetic head has undergone inversion of magnetization direction, said magnetic field extending in a direction opposite to the magnetization direction of the fixed layer.

7. The method according to claim 6, wherein a sense current is supplied to the magnetic head when the element part abuts on the bumps.

8. A method of evaluating a magnetic head, designed to determine as to whether the fixed layer of the magnetic head has undergone inversion of magnetization direction, said method comprising:
   a first Dibit waveform-acquiring step of acquiring a first Dibit waveform by monitoring a voltage at which a sense current is supplied, over a disk that is rotating and has no bumps;
   an impact-applying step of applying an impact to the disk, first by supporting the magnetic head above a disk rotating and having bumps, and supplying a DC current to a write coil of the magnetic head, thereby thermally deforming an element part of the magnetic head and making the element part to protrude and abut on the bumps, then by applying a magnetic field to the top of a core slider of the magnetic head when the element part abuts on the bumps, said magnetic field extending in a direction opposite to the magnetization direction of the fixed layer;
   a second Dibit waveform-acquiring step of acquiring a second Dibit waveform by monitoring a voltage at which a sense current is supplied, over the disk that is rotating and has no bumps; and
   an inversion-detecting step of determining as to whether the fixed layer of the magnetic head has undergone inversion of magnetization direction, by comparing the first Dibit waveform with the second Dibit waveform.

9. The method according to claim 8, wherein the disk has bumps formed in a region extending in a radial direction and arranged at predetermined intervals in a circumferential direction; in the first and second Dibit waveform-acquiring steps, the magnetic head is supported above a region of the disk, where no bumps are formed; and in the impact-applying step, the magnetic head is supported above the region of the disk, where the bumps are formed.

10. The method according to claim 6, wherein the magnetic head is evaluated after the magnetic head has been equipped with a completed HGA (Head Gimbal Assembly).

11. A method of evaluating a magnetic head by applying an impact to the magnetic head under specific condition and then determining as to whether a fixed layer of the magnetic head undergoes inversion of magnetization direction using a disk having bumps that apply the impact to the magnetic head while being rotated,
    wherein said specific condition comprises a step of applying a magnetic field to a top of a core slider of the magnetic head when an element part of said magnetic head abuts on the bumps so as to determine as to whether the fixed layer of the magnetic head has undergone inversion of magnetization direction, said magnetic field extending in a direction opposite the magnetization direction of the fixed layer.

12. The method according to claim 10, wherein the bumps have been formed by applying a laser beam to a disk-shaped medium.

13. The method according to claim 10, which has a bump region in which bumps are formed, and a non-bump region in which no bumps are formed.

* * * * *